(12) United States Patent
Yin et al.

(10) Patent No.: US 9,025,611 B2
(45) Date of Patent: *May 5, 2015

(54) POLICY DECISION FUNCTION ADDRESSING METHOD, NETWORK ELEMENT AND NETWORK SYSTEM

(75) Inventors: Yu Yin, Shanghai (CN); Ying Hu, Shenzhen (CN); Shanshan Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 61 days.

This patent is subject to a terminal disclaimer.

(21) Appl. No.: 13/617,257

(22) Filed: Sep. 14, 2012

(65) Prior Publication Data

US 2013/0016732 A1     Jan. 17, 2013

Related U.S. Application Data

(63) Continuation of application No. 12/749,039, filed on Mar. 29, 2010, now Pat. No. 8,320,390, which is a continuation of application No. PCT/CN2008/072521, filed on Sep. 25, 2008.

(30) Foreign Application Priority Data

Sep. 30, 2007   (CN) .......................... 2007 1 0151383
Oct. 31, 2007   (CN) .......................... 2007 1 0166427

(51) Int. Cl.
*H04L 12/24*   (2006.01)
*H04L 12/56*   (2006.01)
(Continued)

(52) U.S. Cl.
CPC ............ *H04L 41/0893* (2013.01); *H04L 12/14* (2013.01); *H04L 12/1403* (2013.01);
(Continued)

(58) Field of Classification Search
USPC ........ 370/328, 338, 389, 401, 471; 455/414.1
See application file for complete search history.

(56) References Cited

U.S. PATENT DOCUMENTS 7,120,156 B2 * 10/2006 Foti et al. ...................... 370/401
7,522,613 B2    4/2009 Rotsten et al.
(Continued)

FOREIGN PATENT DOCUMENTS

CN        1998182 A      7/2007
CN      101796794 A      8/2010
(Continued)

OTHER PUBLICATIONS

"TS 23.203—$3^{rd}$ Generation Partnership Project; Technical Specification Group Services and System Aspects; Policy and Charging Control Architecture (Release 7)," 3GPP Technical Specification, Mar. 2007, V7.2.0, 3GPP, Valbonne, France.
(Continued)

*Primary Examiner* — Edan Orgad
*Assistant Examiner* — Emmanuel Maglo
(74) *Attorney, Agent, or Firm* — Leydig, Voit & Mayer, Ltd.

(57) ABSTRACT

A policy decision function (PDF) addressing method includes: receiving a PDF allocation request that contains a user equipment (UE) identifier (ID) from a second network element (NE); obtaining ID information of a PDF associated with the UE ID according to pre-registered addressing information of the PDF, where the addressing information of the PDF is an association between the UE ID and the ID information of the PDF, and the PDF associated with the UE ID is accessed by a first NE; and sending the obtained ID information of the PDF to the second NE.

3 Claims, 12 Drawing Sheets

(51) Int. Cl.
*H04L 12/14* (2006.01)
*H04L 12/28* (2006.01)
*H04L 29/12* (2006.01)
*H04L 29/08* (2006.01)
*H04W 8/26* (2009.01)

(52) U.S. Cl.
CPC ......... *H04L12/2856* (2013.01); *H04L 12/2876* (2013.01); *H04L 29/12783* (2013.01); *H04L 61/35* (2013.01); *H04W 8/26* (2013.01); *H04L 67/14* (2013.01); *H04L 67/142* (2013.01)

(56) References Cited

U.S. PATENT DOCUMENTS

| | | | |
|---|---|---|---|
| 7,746,816 B2* | 6/2010 | Attar et al. | 370/318 |
| 7,746,819 B2* | 6/2010 | Skog et al. | 370/328 |
| 7,787,683 B2* | 8/2010 | Khamene et al. | 382/130 |
| 7,899,039 B2 | 3/2011 | Andreasen et al. | |
| 8,514,809 B2* | 8/2013 | Hwang et al. | 370/331 |
| 2003/0108015 A1* | 6/2003 | Li | 370/338 |
| 2005/0149754 A1 | 7/2005 | Rasanen | |
| 2007/0036308 A1 | 2/2007 | Mallya et al. | |
| 2007/0066286 A1* | 3/2007 | Hurtta | 455/414.1 |
| 2007/0162599 A1 | 7/2007 | Nguyen | |
| 2008/0274729 A1 | 11/2008 | Kim et al. | |
| 2009/0213794 A1 | 8/2009 | Rotsten et al. | |
| 2009/0228956 A1 | 9/2009 | He et al. | |
| 2010/0223282 A1 | 9/2010 | Lataste et al. | |

FOREIGN PATENT DOCUMENTS

| | | |
|---|---|---|
| WO | WO 2004071104 A2 | 8/2004 |
| WO | WO 2005069580 A1 | 7/2005 |
| WO | WO 2006059287 A1 | 6/2006 |

OTHER PUBLICATIONS

"TS 23.207—3$^{rd}$ Generation Partnership Project; Technical Specification Group Services and System Aspects; End-to-End Quality of Service (QoS) Concept and Architecture (Release 6)," 3GPP Technical Specification, Sep. 2005, V6.6.0, 3GPP, Valbonne, France.

"TS 23.402—3$^{rd}$ Generation Partnership Project; Technical Specification Group Services and System Aspects; Architecture Enhancements for Non-3GPP Accesses (Release 8)," 3GPP Technical Specification, Jun. 2007, V1.1.0, 3GPP, Valbonne, France.

2$^{nd}$ Office Action in corresponding Chinese Patent Application No. 200710166427.9 (Jan. 12, 2011).

Extended European Search Report in corresponding European Patent Application No. 08800993.1 (Aug. 13, 2010).

Extended European Search Report in corresponding European Patent Application No. 11172907.5 (Sep. 1, 2011).

1$^{st}$ Office Action in corresponding Japanese Patent Application No. 2010-526137 (Feb. 20, 2012).

International Search Report in corresponding International Patent Application No. PCT/CN2008/072521 (Dec. 25, 2008).

Written Opinion of the International Searching Authority in corresponding International Patent Application No. PCT/CN2008/072521 (Dec. 25, 2008).

* cited by examiner

US 9,025,611 B2

POLICY DECISION FUNCTION ADDRESSING METHOD, NETWORK ELEMENT AND NETWORK SYSTEM

CROSS-REFERENCE TO RELATED APPLICATIONS

This application is a continuation of U.S. patent application Ser. No. 12/749,039, filed Mar. 29, 2010, which is a continuation of International Patent Application No. PCT/CN2008/072521, filed on Sep. 25, 2008. The International Patent Application claims priority to Chinese Patent Application No. 200710151383.2, filed on Sep. 30, 2007, and Chinese Patent Application No. 200710166427.9, filed on Oct. 31, 2007, all of which are hereby incorporated by reference in their entireties.

FIELD OF THE INVENTION

The present invention relates to a communication technology, and in particular, to a policy decision function (PDF) addressing method, a network element (NE) and a network system.

BACKGROUND OF THE INVENTION

In a current network system, the policy and charging control (PCC) protocol is used to exercise quality of service (QoS) control and charging control over data services between a user equipment (UE) and a packet data network gateway. A PDF is an entity used to generate policy control information for exercising QoS control and charging control over data services. A gateway (access gateway or packet data network gateway) is a policy enforcement point (PEP). The gateway obtains policy control information from the PDF, and then exercises QoS control and charging control over data services between the UE and the packet data gateway (also called a public data network gateway, PDN GW) according to the obtained policy control information.

In the prior art, the UE may require two data connections: one is connected to gateway 1 and the other is connected to gateway 2. Gateway 1 and gateway 2 access a PDF according to the UE identifier (UE ID) and ID of a public data network (PDN). Gateway 1 and gateway 2 may not access the same PDF.

During the research and practice of the prior art, the inventor discovers the following problems:

In the technical solution of the prior art, NEs that want to access a PDF cannot access the same PDF in the data connection of the same UE.

SUMMARY OF THE INVENTION

The objective of embodiments of the present invention is to provide a policy decision function (PDF) addressing method, a network element (NE) and a network system to ensure NEs that want to access a PDF can access the same PDF in the data connection of the same UE.

To achieve the preceding objective, embodiments of the present invention provide the following technical solutions:

A PDF addressing method includes:
receiving a PDF allocation request that contains a UE identifier (UE ID) from a second NE;
obtaining ID information of a PDF associated with the UE ID according to pre-registered addressing information of the PDF, where the addressing information of the PDF is an association between the UE ID and the ID information of the PDF and the PDF associated with the UE ID is accessed by a first NE; and
sending the obtained ID information of the PDF to the second NE.

An NE includes:
a PDF request receiving unit, configured to receive a PDF allocation request that contains a UE ID;
a PDF ID information obtaining unit, configured to obtain ID information of a PDF associated with the UE ID according to pre-registered addressing information of the PDF, where the addressing information of the PDF is an association between the UE ID and the ID information of the PDF, and the PDF associated with the UE ID is accessed by a first NE; and
a PDF ID information outputting unit, configured to output the obtained ID information of the PDF.

A network system includes a policy management entity (PME) and a second NE, where:
the PME is configured to: receive a PDF allocation request that contains a UE ID from a second NE; obtain ID information of a PDF associated with the UE ID according to pre-registered addressing information of the PDF, where the addressing information of the PDF is an association between the UE ID and the ID information of the PDF and the PDF associated with the UE ID is accessed by a first NE; and send the obtained ID information of the PDF to the second NE; and
the second NE is configured to: send the PDF allocation request to the PME, and receive the ID information of the PDF sent from the PME.

Any of the preceding technical solutions may bring the following benefits:

In embodiments of the present invention, after a PDF allocation request is received from the second NE, the ID information of the PDF associated with the UE ID is obtained according to the pre-registered addressing information of the PDF, that is, ID information of the PDF accessed by the first NE, and then the obtained ID information of the PDF is sent to the second NE so that the second NE and the first NE access the same PDF. Thus, for the data connection of the same UE, different NEs that want to access a PDF may access the same PDF.

DETAILED DESCRIPTION OF THE EMBODIMENTS

A PDF addressing method according to an embodiment of the present invention includes: receiving a PDF allocation request that contains a UE ID from a second NE; obtaining ID information of a PDF associated with the UE ID according to pre-registered addressing information of the PDF, where the addressing information of the PDF is an association between the UE ID and the ID information of the PDF, and the PDF associated with the UE ID is accessed by a first NE; and sending the obtained ID information of the PDF to the second NE. The ID information of the PDF may be the domain name and/or address information of the PDF. The first NE may be an access gateway, a PDN GW or a PDF in a visited network (also referred to as "visited PDF" hereunder). The second NE may be an access gateway, a PDN GW, a visited PDF or an application function. The access gateway and PDN GW are PEPs.

Figure 1:
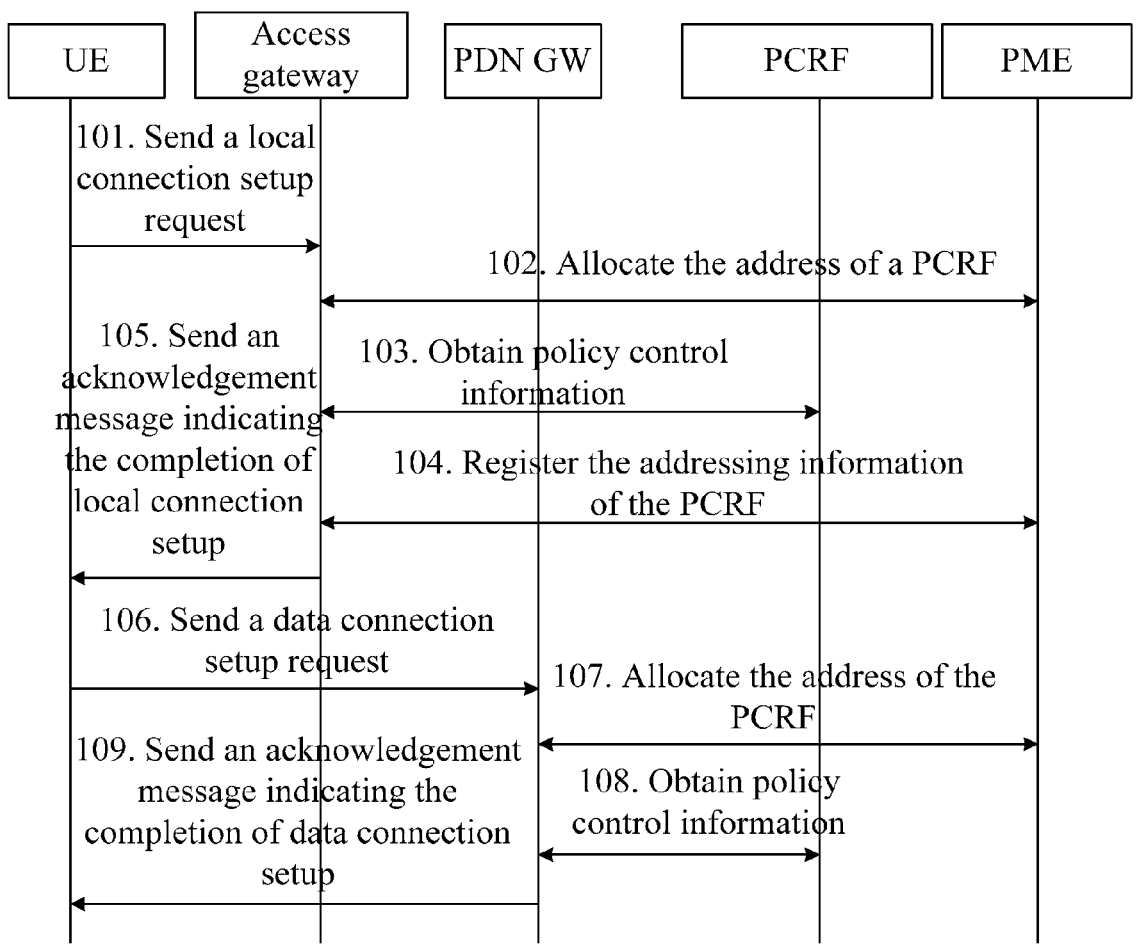
FIG. 1 is a flowchart of a PDF addressing method according to a first embodiment of the present invention.

FIG. 1 shows a PDF addressing method according to the first embodiment of the present invention. The method is applicable to scenarios where a non-3GPP access network is used on a 3GPP system architecture evolution (SAE) network. The access gateway of the non-3GPP access network is the PEP of the non-3GPP access network. The PDN GW is the core gateway of the SAE network. Being the PEP of a core network, the PDF is responsible for generating policy control information. The PDF may also integrate charging functions to work as a policy and charging rules function (PCRF). In this embodiment, the PDF may or may not integrate the charging control function. In this method, the UE first sets up a local connection in the local network, and then sets up a data connection with the PDN GW. A PME is added. The PME is configured to maintain addressing information of the PCRF. The method includes the following steps:

Step 101: The UE sends a local connection setup request to the access gateway.

Step 102: The access gateway interacts with the PME to request the address of the PCRF.

Specifically, this step is as follows: The access gateway sends a PDF address allocation request to the PME, where the request contains the UE ID, or UE ID and PDN ID; the PME searches for the address of a matching PDF according to the UE ID, or UE ID and PDN ID; if finding the matching PDF, the PME returns the address of the PDF to the access gateway; otherwise, the PME allocates a proper PDF for the UE, and returns the address of the allocated PDF to the access gateway, or the PME returns a PCRF address request failure to the access gateway to inform the access gateway of selecting its own PCRF. The preceding returned address of the PDF is the address of the PCRF.

Step 103: The access gateway interacts with the PCRF to obtain policy control information.

In this step, the access gateway finds the PCRF according to the address of the PCRF sent from the PME, and obtains the policy control information from the PCRF. If the PME returns a PCRF address request failure to the access gateway, the access gateway selects a proper PCRF and obtains the policy control information from the selected PCRF.

Step 104: The access gateway registers the addressing information of the PCRF with the PME.

The addressing information of the PCRF may be an association between the UE ID and the address of the PCRF or an association among the UE ID, the PDN ID and the PCRF.

Specifically, step 104 is as follows: The access gateway sends a registration request containing the addressing information of the PCRF to the PME, and the PME registers the addressing information of the PCRF.

If the PME does not find a matching PDF in step 102, the PME allocates a proper PDF for the UE, or the PME returns a PCRF address request failure to the access gateway to inform the access gateway of selecting its own PCRF, the access gateway needs to select a proper PCRF before step 103 and step 104.

If the PME finds the matching PCRF according to the UE ID or UE ID and PDN ID and sends the address of the PCRF to the access gateway or allocates an address of a PCRF for the access gateway in step 102, the PME may store the addressing information of the PCRF in step 102. In this case, step 104 is optional.

Step 105: The access gateway sends an acknowledgement message indicating the completion of local connection setup to the UE.

Step 106: The UE sends a data connection setup request to the PDN GW.

Step 107: The PDN GW accesses the PME to request the address of the PCRF, and the PME sends the address of the PCRF to the PDN GW.

Specifically, this step is as follows: The PDN GW sends a request for the address of the PDF to the PME, where the request contains the UE ID; the PME obtains the address of the PCRF associated with the UE ID according to the pre-registered addressing information of the PCRF, and sends the address of the PCRF to the PDN GW.

Step 108: The PDN GW interacts with the PCRF to obtain policy control information.

Step 109: The PDN GW sends an acknowledgement message indicating the completion of data connection setup to the UE.

In the first embodiment of the present invention, after receiving the PDF address allocation request from the PDN GW, the PME obtains the address of the PDF associated with the UE ID (address of the PDF accessed by the access gateway) according to the pre-registered addressing information of the PDF; the PME then sends the obtained address of the PDF to the PDN GW. Thus, the PDN GW and the access gateway can access the same PDF to exercise policy control over data streams in the data connection of the same UE.

Figure 2:
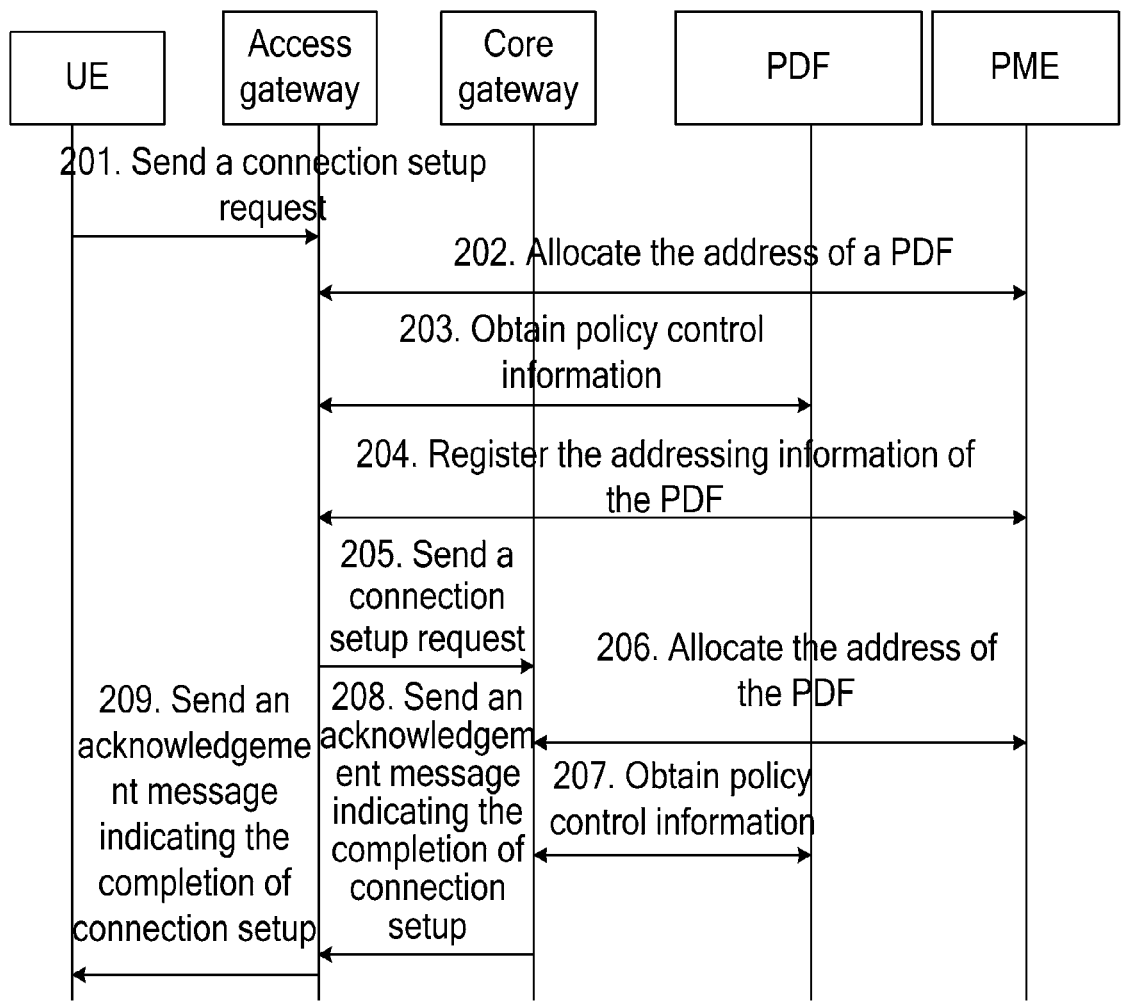
FIG. 2 is a flowchart of a PDF addressing method according to a second embodiment of the present invention.

FIG. 2 shows a PDF addressing method according to the second embodiment of the present invention. The method is applicable to a mobile network, with more than two PEPs. Each PEP needs to interact with the PDF to obtain policy control information. That is, a same IP-connectivity access network (IP-CAN) is connected to a same PDF. The method describes the data connection process supposing the access gateway and core gateway are PEPs. The PDF addressing method includes the following steps:

Step 201: The UE sends a connection setup request to the access gateway.

Step 202: The access gateway interacts with the PME to request the address of the PDF.

Specifically, this step is as follows: The access gateway sends a PDF address allocation request to the PME, where the request contains the UE ID, or UE ID and PDN ID; the PME searches for a matching PDF according to the UE ID, or UE ID and PDN ID; if finding the matching PDF, the PME returns the address of the PDF to the access gateway; otherwise, the PME allocates the UE one or multiple proper PDFs for the access gateway to select, and returns the address of the allocated PDF to the access gateway, or the PME returns a request failure to the access gateway to inform the access gateway of selecting PDF by itself.

Step 203: The access gateway interacts with the PDF to obtain policy control information.

Step 204: The access gateway registers the addressing information of the PDF with the PME.

Step 204 is mandatory if the access gateway selects its own PDF in step 202 and step 203; otherwise, step 204 is optional and the PME may register the addressing information of the PDF automatically after allocating the address of the PDF.

The addressing information of the PDF is an association between the UE ID and the address of the PDF, or an association among the UE ID, the PDN ID and the address of the PDF.

Step 205: The access gateway sends a connection setup request to the core gateway.

Step 206: The core gateway interacts with the PME to request the address of the PDF.

Specifically, this step is as follows: The core gateway sends a PDF address allocation request to the PME, which contains the UE ID; the PME obtains the address of the PDF associated with the UE ID according to the pre-registered addressing information of the PDF, and sends the obtained address of the PDF to the core gateway.

Step 207: The core gateway interacts with the PDF to obtain policy control information.

Step 208: The core gateway sends an acknowledgement message indicating the completion of connection setup to the access gateway.

Step 209: The access gateway sends an acknowledgement message indicating the completion of connection setup to the UE.

In the second embodiment of the present invention, after receiving the PDF address allocation request from the core gateway, the PME obtains the address of the PDF associated with the UE ID (address of the PDF accessed by the access gateway) according to the pre-registered addressing information of the PDF; the PME then sends the obtained address of the PDF to the core gateway. Thus, the core gateway and the access gateway can access the same PDF to exercise policy control over data streams in the data connection of the same UE.

Figure 3:
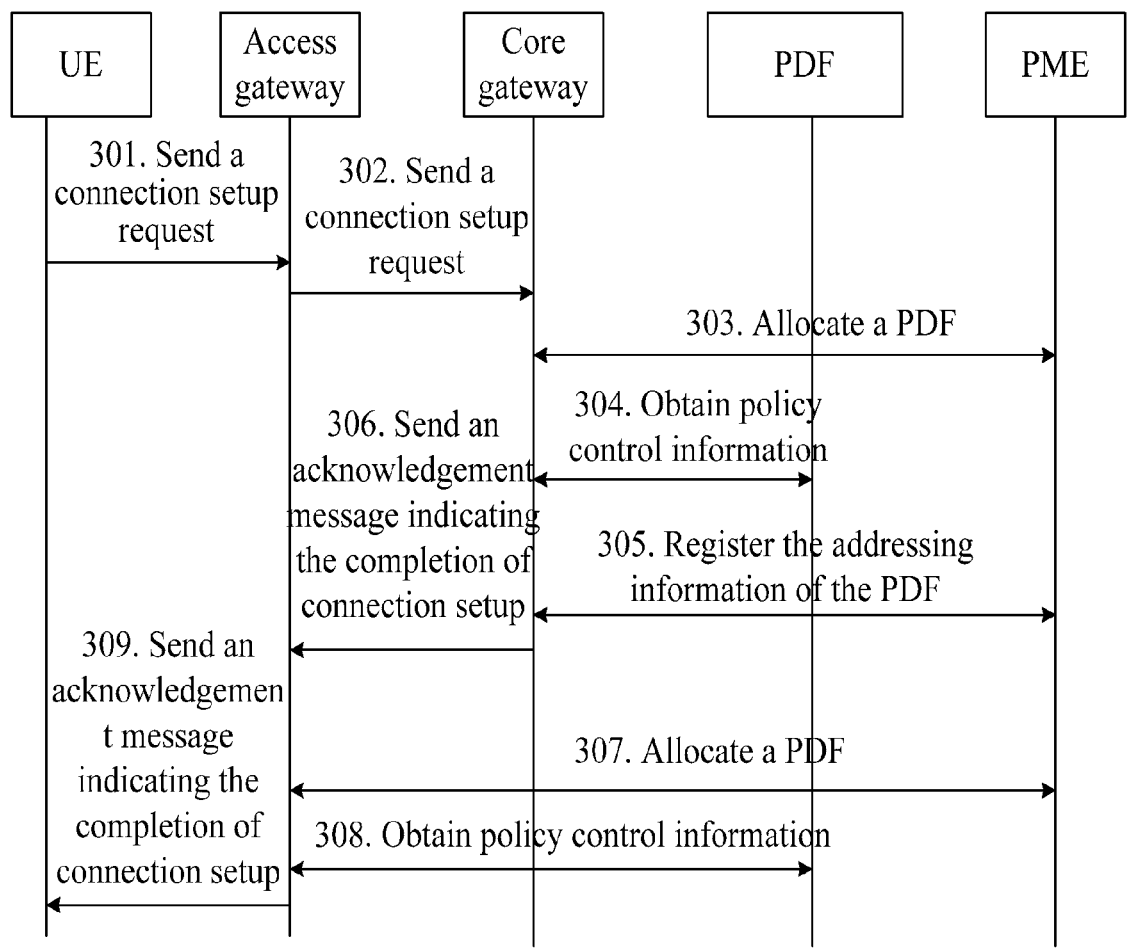
FIG. 3 is a flowchart of a PDF addressing method according to a third embodiment of the present invention.

FIG. 3 shows a PDF addressing method according to the third embodiment of the present invention. The difference between the third embodiment and the second embodiment is as follows: The core network interacts with the PDF, and then registers the addressing information of the PDF with the PME. The method includes the following steps:

Step 301: The UE sends a connection setup request to the access gateway.

Step 302: The access gateway sends a connection setup request to the core gateway.

Step 303: The core gateway interacts with the PME to request the address of the PDF.

Specifically, this step is as follows: The core gateway sends a PDF address allocation request to the PME, where the request contains the UE ID, or UE ID and PDN ID; the PME searches for a matching PDF according to the UE ID, or UE ID and PDN ID; if finding the matching PDF, the PME returns the address of the PDF to the core gateway; otherwise, the PME allocates the UE with one or multiple proper PDFs for the core gateway to select, and returns the address of the allocated PDF to the core gateway, or the PME returns a request failure to the core gateway to inform the core gateway of select PDF by itself.

This step may also be omitted. In this case, the core network selects its own PDF, but step 305 needs to be executed.

Step 304: The core gateway interacts with the PDF to obtain policy control information.

Step 305: The core gateway registers the addressing information of the PDF with the PME.

Step 305 is mandatory if the core network selects its own PDF and interacts with the PDF to obtain policy control information in step 304; otherwise, step 305 is optional and the PME may register the addressing information of the PDF automatically after allocating the address of the PDF.

Step 306: The core gateway sends an acknowledgement message indicating the completion of connection setup to the access gateway.

Step 307: The access gateway interacts with the PME to request the address of the PDF.

Specifically, this step is as follows: The access gateway sends a PDF address allocation request to the PME, which contains the UE ID, or UE ID and PDN ID; the PME obtains the address of the PCRF associated with the UE ID, or UE ID and PDN ID according to the pre-registered addressing information of the PCRF, and sends the obtained address of the PCRF to the access gateway.

Step 308: The access gateway interacts with the PDF to obtain policy control information.

Step 309: The access gateway sends an acknowledgement message indicating the completion of connection setup to the UE.

In the third embodiment of the present invention, after receiving the PDF address allocation request from the access gateway, the PME obtains the address of the PDF associated with the UE ID (address of the PDF accessed by the access gateway) according to the pre-registered addressing information of the PDF; the PME then sends the obtained address of the PDF to the access gateway. Thus, the core gateway and the access gateway can access the same PDF to exercise policy control over data streams in the data connection of the same UE.

Figure 4:
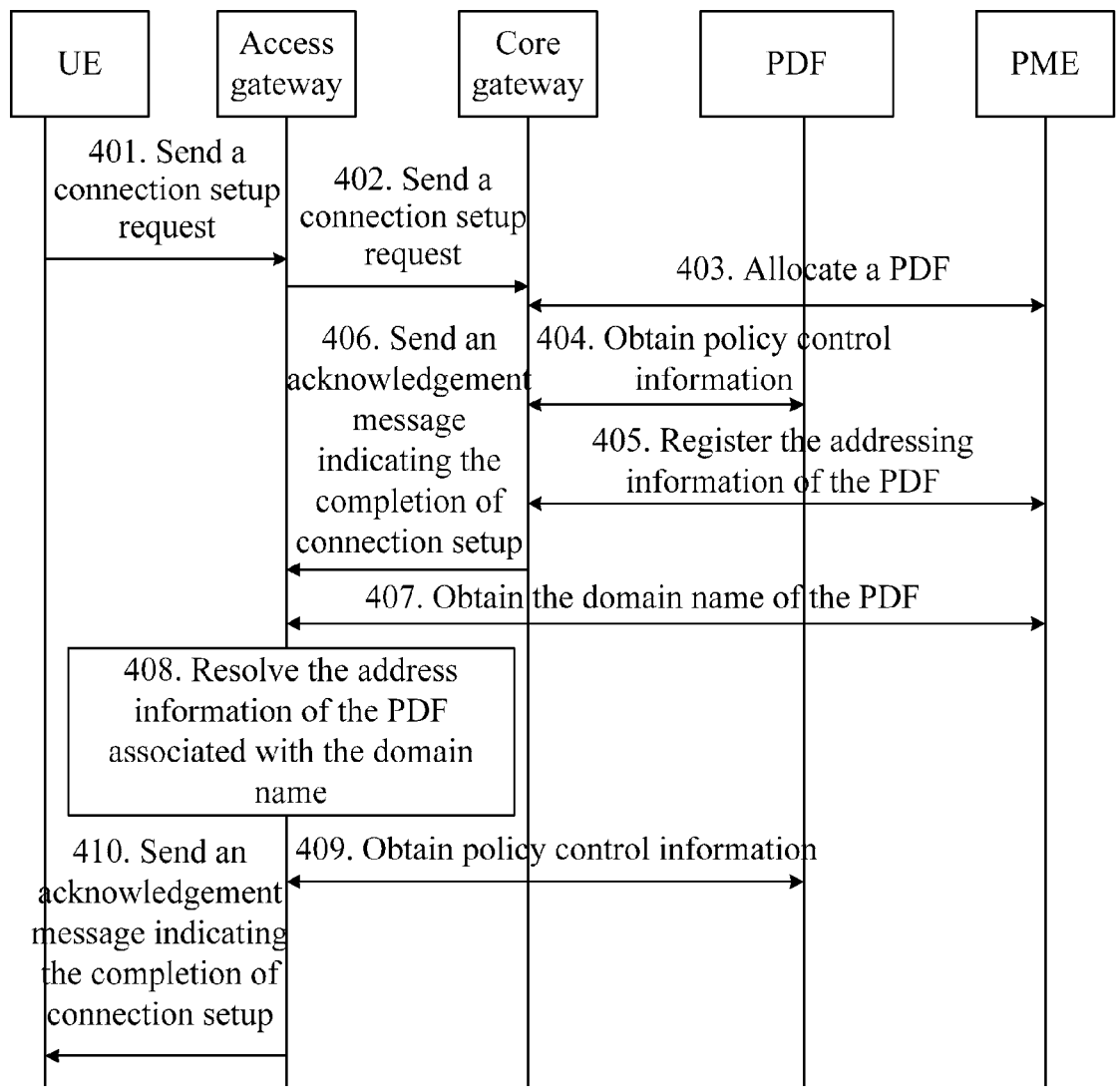
FIG. 4 is a flowchart of a PDF addressing method according to a fourth embodiment of the present invention.

FIG. 4 shows a PDF addressing method according to the fourth embodiment of the present invention. The difference between the fourth embodiment and the third embodiment is as follows: The core network interacts with the PDF, and then registers the addressing information of the PDF with the PME, where the addressing information of the PDF is an association between the UE ID and the domain name of the PDF. The method includes the following steps:

Step 401: The UE sends a connection setup request to the access gateway.

Step 402: The access gateway sends a connection setup request to the core gateway.

Step 403: The core gateway interacts with the PME, requesting the PME to allocate a PDF.

Specifically, this step is as follows: The core gateway sends a PDF allocation request to the PME, which contains the UE ID, or UE ID and PDN ID; the PME searches for a matching PDF according to the UE ID, or UE ID and PDN ID; if finding the matching PDF, the PME returns the domain name of the PDF to the core gateway; otherwise, the PME allocates the UE one or multiple proper PDFs for the core gateway to select, and returns the domain name of the allocated PDF to the core gateway, or the PME returns a request failure to the core gateway to inform the core gateway of selecting PDF by itself This step may also be omitted. In this case, the core network selects its own PDF, but step 405 needs to be executed.

Step 404: The core gateway interacts with the PDF to obtain policy control information.

Step 405: The core gateway registers the addressing information of the PDF with the PME.

Step 405 is mandatory if the core network selects its own PDF and interacts with the PDF to obtain policy control information in step 404; otherwise, step 405 is optional and the PME may register the addressing information of the PDF automatically after allocating the PDF.

Step 406: The core gateway sends an acknowledgement message indicating the completion of connection setup to the access gateway.

Step 407: The access gateway interacts with the PME, requesting the PME to allocate a PDF, and the PME returns the domain name of the PDF to the access gateway.

Specifically, this step is as follows: The access gateway sends a PDF allocation request to the PME, which contains the UE ID, or UE ID and PDN ID; the PME obtains the domain name of the PDF associated with the UE ID, or UE ID and PDN ID according to the pre-registered addressing information of the PDF, and sends the obtained domain name of the PDF to the access gateway.

Step 408: The access gateway receives the domain name of the PDF, and resolves the address information of the PDF associated with the domain name through the domain name resolution service.

Step 409: The access gateway interacts with the PDF to obtain policy control information.

In this embodiment, the access gateway may also not resolve the address information associated with the domain name of the PDF. Instead, the access gateway sends the domain name of the PDF to an agent (for example, a relay agent and a proxy agent). Then, the agent resolves the address information associated with the domain name of the PDF through the domain name resolution service, then interacts with the PDF to obtain policy control information, and sends the obtained policy control information to the access gateway.

Step 410: The access gateway sends an acknowledgement message indicating the completion of connection setup to the UE.

In the fourth embodiment of the present invention, after receiving the PDF allocation request from the access gateway, the PME obtains the domain name of the PDF associated with the UE ID (domain name of the PDF accessed by the core gateway) according to the pre-registered addressing information of the PDF; the PME then sends the obtained domain name of the PDF to the access gateway. Thus, the core gateway and the access gateway can access the same PDF to exercise policy control over data streams in the data connection of the same UE. In other embodiments of the present invention, a PDF may also be identified by a domain name, and the address information associated with the domain name may be obtained through the domain name resolution service.

Figure 5:
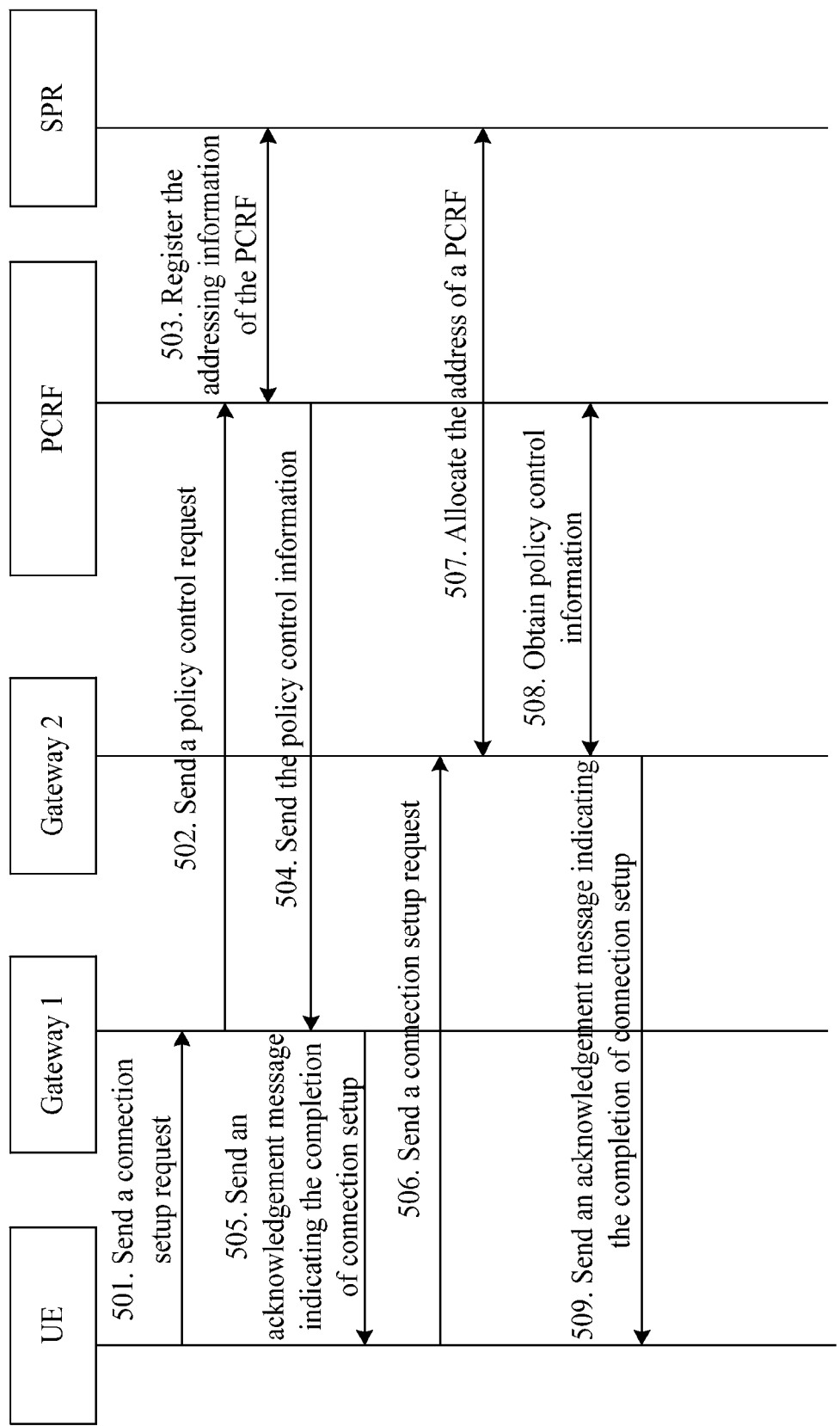
FIG. 5 is a flowchart of a PDF addressing method according to a fifth embodiment of the present invention.

FIG. 5 shows a PDF addressing method according to the fifth embodiment of the present invention. The method is applicable to the SAE network. The PDF is included in the PCRF of the SAE network, and a subscription profile repository (SPR) is a PDF management NE with a built-in PME. The SAE network supports the UE in connecting to multiple PDN networks, and the UE sets up two IP-CAN connections with two PDN networks through gateway 1 of a first PDN (PEP) and gateway 2 of a second PDN (PEP). Thus, a same PDF is used to manage two IP-CAN connections of the same UE. The method includes the following steps:

Step 501: The UE sends a connection setup request to the gateway 1 to access the first PDN.

Step 502: The gateway 1 sends a policy control request containing the UE ID to the PCRF.

Step 503: The PCRF generates policy control information according to the policy control request, and registers the addressing information of the PCRF with the SPR.

The addressing information of the PCRF is an association between the address of the PCRF and the UE ID.

Step 504: The PCRF sends the policy control information to the gateway 1.

Step 505: The gateway 1 sends an acknowledgement message indicating the completion of connection setup to the UE.

Step 506: The UE sends a connection setup request to the gateway 2 to access the second PDN.

Step 507: The gateway 2 accesses the SPR to request the address of the PCRF.

Specifically, this step is as follows: The gateway 2 sends a PDF address allocation request that contains the UE ID; the SPR obtains the address of the PCRF associated with the UE ID according to the pre-registered addressing information of the PCRF.

Step 508: The gateway 2 interacts with the PCRF to obtain policy control information.

Step 509: The gateway 2 sends an acknowledgement message indicating the completion of connection setup to the UE.

In the fifth embodiment of the present invention, a same PCRF may be used to manage more than two IP-CAN connections of the same UE, which does not affect the implementation of the present invention.

In the fifth embodiment of the present invention, after receiving the PDF address allocation request from the gateway 2, the SPR with a built-in PME obtains the address of the PDF associated with the UE ID (address of the PDF accessed by the gateway 1) according to the pre-registered addressing information of the PDF; the SPR then sends the obtained address of the PDF to the gateway 2. Thus, the gateway 1 and gateway 2 can access the same PDF. So multiple data connections of the same UE can only use the same PDF. In this case, only one PDF is required to maintain the user information of the UE, which reduces the user information maintenance workload of the PDF in the whole network.

Figure 6:
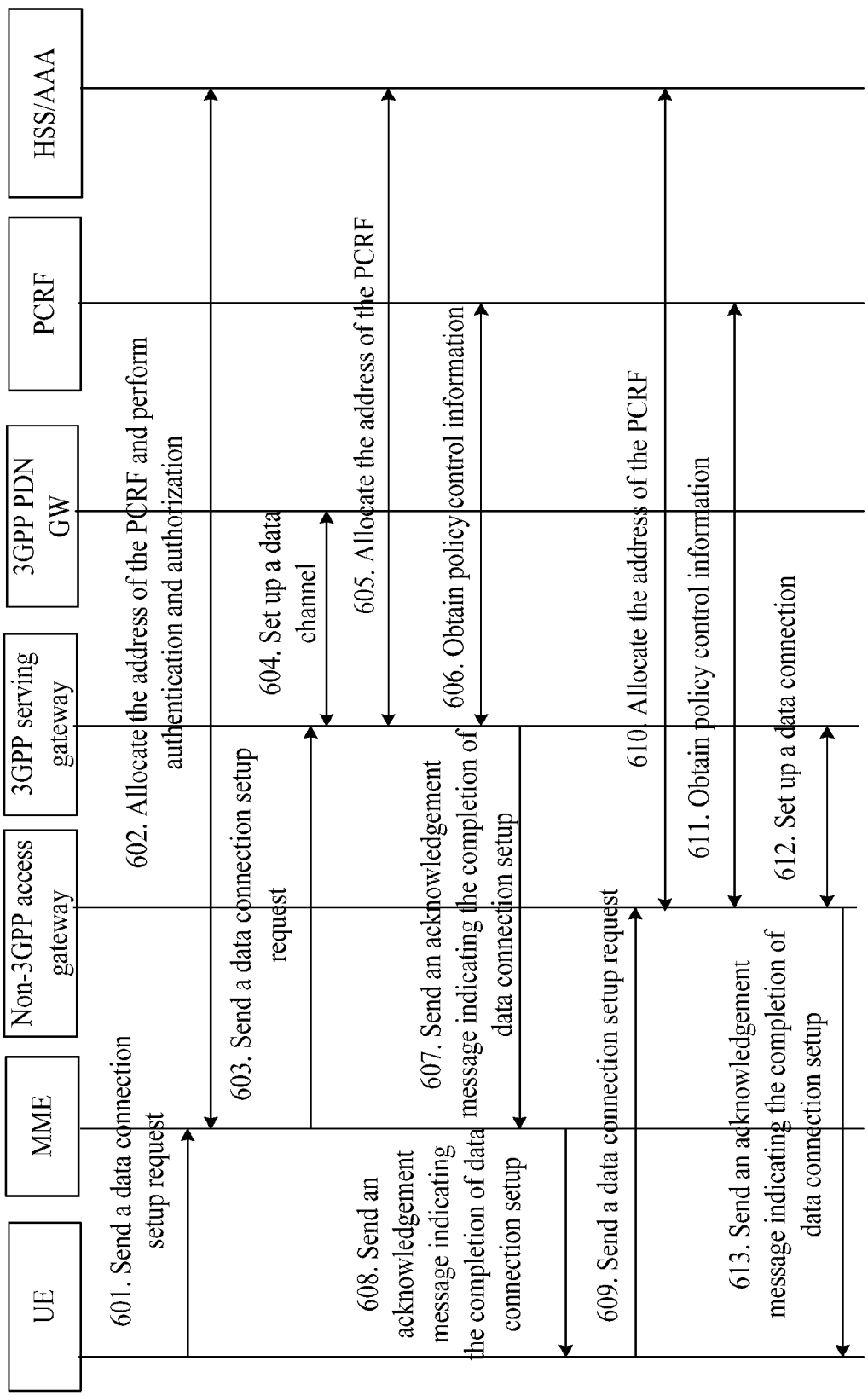
FIG. 6 is a flowchart of a PDF addressing method according to a sixth embodiment of the present invention.

FIG. 6 shows a PDF addressing method according to the sixth embodiment of the present invention. The method is applicable to a scenario where a handover between an SAE network and another network occurs. The UE is connected to the PDN through a mobility management entity (MME) and SAE network gateways on the 3GPP access network, where the SAE network gateways include a serving gateway (PEP) and a PDN GW (PEP). The UE is connected to the PDN through the access gateway and PDN GW of the SAE network on the non-3GPP access network. The method includes the following steps:

Step 601: The UE sends a data connection setup request to the MME.

Step 602: The MME obtains user subscription information from a user information server, for example, a home subscriber server (HSS) or an authentication, authorization and accounting (AAA) server, and performs authentication and authorization on the user according to the user subscription information. The MME sends a PCRF allocation request which contains the UE ID to the user information server. The PME in the user information server checks whether the addressing information of the PCRF is already available according to the UE ID; if already available, the PME obtains the address of the PCRF associated with the UE ID according to the addressing information of the PCRF; if the PME does not register the addressing information of the PCRF, the PME allocates an address of a PCRF.

The addressing information of the PCRF in this step may be an association between the UE ID and the address of the PCRF, or an association among the UE ID, the PDN ID and the address of the PCRF.

In this step, the PME may store the association between the allocated address of the PDF and the UE ID as the addressing information of the PDF, or the association among the allocated address of the PDF, the UE ID and the PDN ID as the addressing information of the PDF, or the MME registers the addressing information with the PME after step 607.

Step 603: The MME sends a data connection setup request containing the address of the PCRF to the 3GPP serving gateway.

Step 604: The 3GPP serving gateway interacts with the 3GPP PDN GW, and sets up a data channel between the serving gateway and the PDN GW.

Step 605: The 3GPP serving gateway sends a PCRF allocation request to the user information server. The PME in the user information server checks whether the addressing information of the PCRF is already available according to the UE ID; if already available, the PME obtains the address of the PCRF associated with the UE ID according to the addressing information of the PCRF; if the PME does not register the addressing information of the PCRF, the PME allocates an address of a PCRF, and stores the addressing information of the PCRF.

The address of the PCRF may be allocated either in step 602 or step 605. If step 605 is executed, the address of the PCRF will not be contained in the data connection setup request that the MME sends to the 3GPP serving gateway in step 603.

Step 606: The 3GPP serving gateway interacts with the PCRF to obtain policy control information.

Step 607: The 3GPP serving gateway sends an acknowledgement message indicating the completion of data connection setup to the MME.

Step 608: The MME sends an acknowledgement message indicating the completion of data connection setup to the UE.

The serving gateway may select PCRF by itself, and the 3GPP serving gateway may makes the address of the PCRF contained in the acknowledgement message indicating the completion of data connection setup in step 607, and the MME may register the addressing information of the PCRF with the PME; or, when the PME allocates addresses of multiple available PCRFs in step 602, the MME may select an address of a one PCRF and send it to the 3GPP serving gateway in step 603, and the MME registers the addressing information of the selected PCRF with the PME after receiving the acknowledgement message indicating the completion of data connection setup from the 3GPP serving gateway in step 607.

Step 609: The UE accesses a non-3GPP access network, and sends a data connection setup request to the non-3GPP access gateway.

Step 610: The non-3GPP access gateway interacts with the user information server to request the address of the PCRF.

Specifically, this step is as follows: The non-3GPP access gateway sends a PDF address allocation request to the user information server; the PME in the user information server checks whether the addressing information of the PCRF is already available according to the UE ID; if already available, the PME obtains the address of the PCRF associated with the UE ID according to the addressing information of the PCRF; if the PME does not register the addressing information of the PCRF, the PME allocates an address of a PCRF and stores the addressing information of the PCRF.

Step 611: The non-3GPP access gateway interacts with the PCRF to obtain policy control information.

Step 612: The non-3GPP access gateway interacts with the 3GPP serving gateway, and sets up a data connection with the serving gateway.

Step 613: The non-3GPP access gateway sends an acknowledgement message indicating the completion of data connection setup to the UE.

In the sixth embodiment of the present invention, when the UE is handed over from one network to another network, the PME obtains the address of the PDF (address of the PDF accessed by the PEP on the source network) associated with the UE ID according to the pre-registered addressing information of the PDF after receiving the PDF address allocation request from the PEP on the target network, and sends the obtained address of the PDF to the PEP on the target network. Thus, the data connection of the target network can use the same PDF as that of the target network, which avoids the failure of data service transmission due to an inter-network handover.

Figure 7:
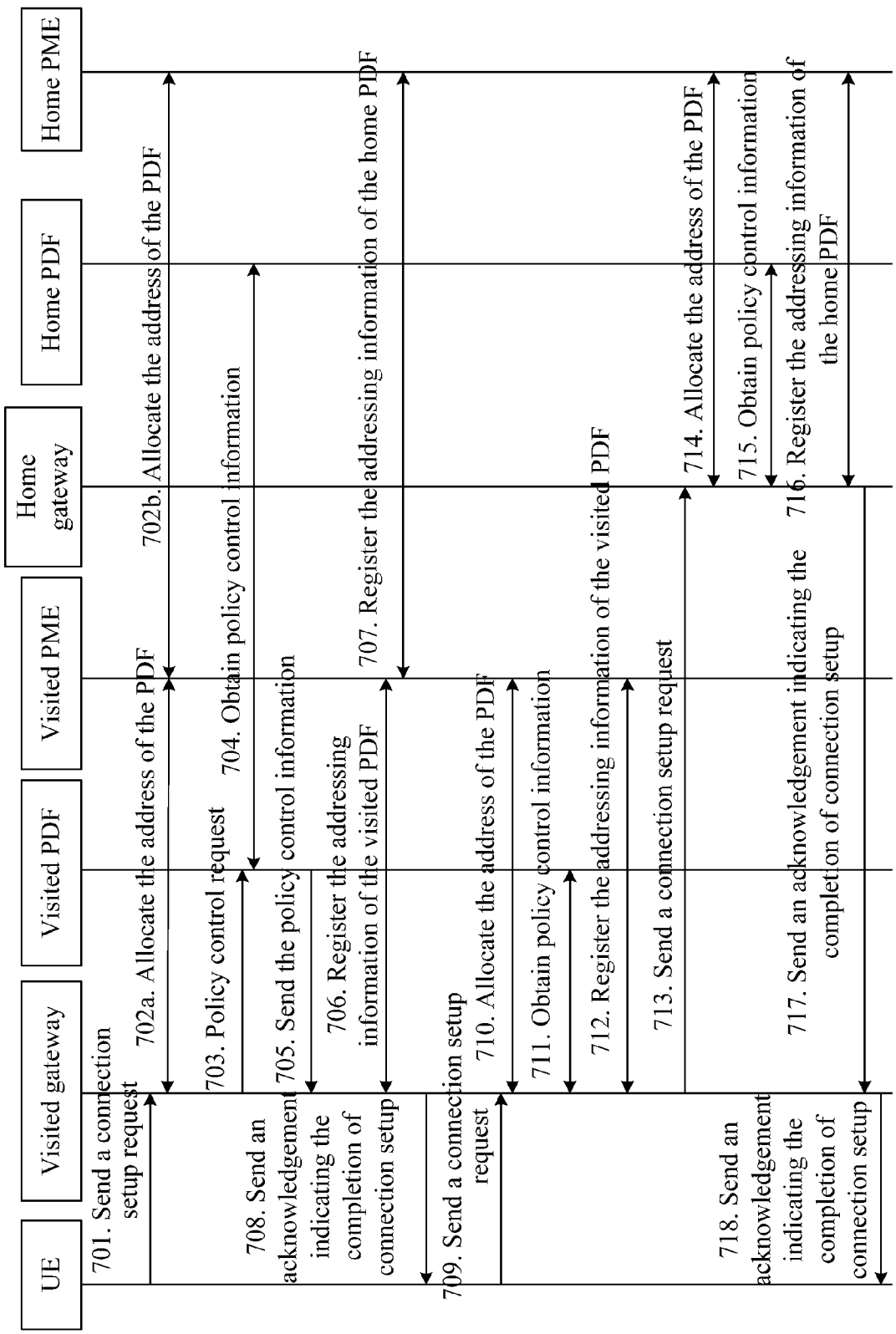
FIG. 7 is a flowchart of a PDF addressing method according to a seventh embodiment of the present invention.

FIG. 7 shows a PDF addressing method according to the seventh embodiment of the present invention. The method is applicable to a scenario in which the UE accesses a PDN by setting up data connections with a visited gateway and a home gateway when roaming. The data connection with the visited gateway is used for optimizing the route of the UE in the visited network. The method may ensure that these two data connections use the same visited PDF and home PDF.

Step 701: The UE sends a connection setup request to the visited gateway (PEP).

Step 702: The visited gateway interacts with the visited PME to request the address of a visited PDF; the visited gateway requests the address of a home PDF by the interaction with the home PME through the visited PME.

Step 703: The visited gateway sends a policy control request to the visited PDF. The policy control request includes the UE ID, PDN ID and address of the home PDF.

Step 704: The visited PDF obtains the policy control information of the home network from the home PDF.

Step 705: The visited PDF generates policy control information of the visited network, negotiates with the policy control information of the home network to obtain policy control information, and sends the obtained policy control information to the visited gateway.

Step 706: The visited gateway interacts with the visited PME, and registers the addressing information of the visited PDF with the visited PME.

The visited gateway sends a registration request containing the UE ID, address of the visited PDF and address of the home PDF to the visited PME during the interaction, which may also contain the PDN ID. The visited PME registers the addressing information of the visited PDF according to the registration request. The addressing information of the visited PDF is an association between the UE ID and the address of the visited PDF, or an association among the UE ID, the PDN ID and the address of the visited PDF.

Step 707: The visited PME interacts with the home PME, and registers the addressing information of the home PDF with the home PME.

Specifically, this step is as follows: The visited PME sends a registration request containing the addressing information of the home PDF to the home PME, where the registration request includes the UE ID and address of the home PDF; the home PME registers the addressing information of the home PDF according to the registration request.

Step 708: The visited gateway sends an acknowledgement message indicating the completion of connection setup to the UE.

Step 709: The UE sends a connection setup request to the visited gateway (PEP).

Step 710: The visited gateway sends a visited PDF address allocation request to the visited PME; the visited PME checks whether the addressing information of the visited PDF is already available according to the UE ID; if already available, the visited PME obtains the address of the visited PDF associated with the UE ID and sends it to the visited gateway; otherwise, the visited PME allocates an address of a visited PDF.

Step 711: The visited gateway obtains policy control information from the visited PDF.

Step 712: The visited gateway registers the addressing information of the visited PDF with the visited PME.

Specifically, this step is as follows: The visited gateway sends a registration request containing the UE ID and address of the visited PDF to the visited PME, where the registration request may further include the PDN ID. The visited PME registers the addressing information of the visited PDF according to the registration request. The addressing information of the visited PDF is an association between the UE ID and the address of the visited PDF, or an association among the UE ID, the PDN ID and the address of the visited PDF.

If the visited PME finds the addressing information of the PDF according to the UE ID in step 710, step 712 is omitted.

Step 713: The visited gateway sends a connection setup request that contains the policy control information of the visited network to the home gateway.

Step 714: The home gateway sends a home PDF address allocation request to the home PME; the home PME checks whether the addressing information of the home PDF is already available according to the UE ID; if already available, the home PME obtains the address of the home PDF associated with the UE ID and sends it to the home gateway; otherwise, the home PME allocates an address of a home PDF.

Step 715: The home gateway obtains policy control information from the home PDF.

Step 716: The home gateway registers the addressing information of the home PDF with the home PME.

If the home PME finds the addressing information of the PDF according to the UE ID in step 714, step 716 is omitted.

Specifically, this step is as follows: The home gateway sends a registration request containing the addressing information of the home PDF to the home PME; the home PME registers the addressing information of the home PDF according to the registration request.

Step 717: The home gateway performs policy negotiation on the obtained policy control information of the home network and the policy control information of the visited network to obtain the policy control information, and sends an acknowledgement message indicating the completion of connection setup to the visited gateway, where the acknowledgement message contains the obtained policy control information.

Step 718: The visited gateway sends an acknowledgement message indicating the completion of connection setup to the UE.

The preceding steps 701 to 709 describe a process of setting up a data connection between the UE and the visited gateway. The preceding steps 710 to 718 describe a process of setting up a data connection between the UE and the home gateway through the visited gateway. Either of the two data connections may be set up earlier. If the visited PME registers the addressing information of the visited PDF in the earlier data connection process, the visited PME does not need to register the addressing information of the visited PDF in the later data connection process. Similarly, if the home PME registers the addressing information of the home PDF in the earlier data connection process, the home PME does not need to register the addressing information of the home PDF in the later data connection process, which may also achieve the objective of the present invention.

In the seventh embodiment of the present invention, a same PME may also be used to register the addressing information of the PDF. In this case, the addressing information of the PDF is a mapping relation among the address of the home PDF, the address of the visited PDF and the UE ID, which may also achieve the objective of the present invention.

In the seventh embodiment of the present invention, the visited PME registers the addressing information of the visited PDF, and the home PME registers the addressing information of the home PDF. In this case, when the UE sets up data connections with the visited gateway and home gateway to access the PDN, the UE can obtain the addresses of the visited PDF and home PDF that are accessed through the earlier data connection in the later data connection. Thus, the visited PDF and home PDF used by these two data connections are the same, so that multiple data connections of the same UE can use the same home PDF.

Figure 8:
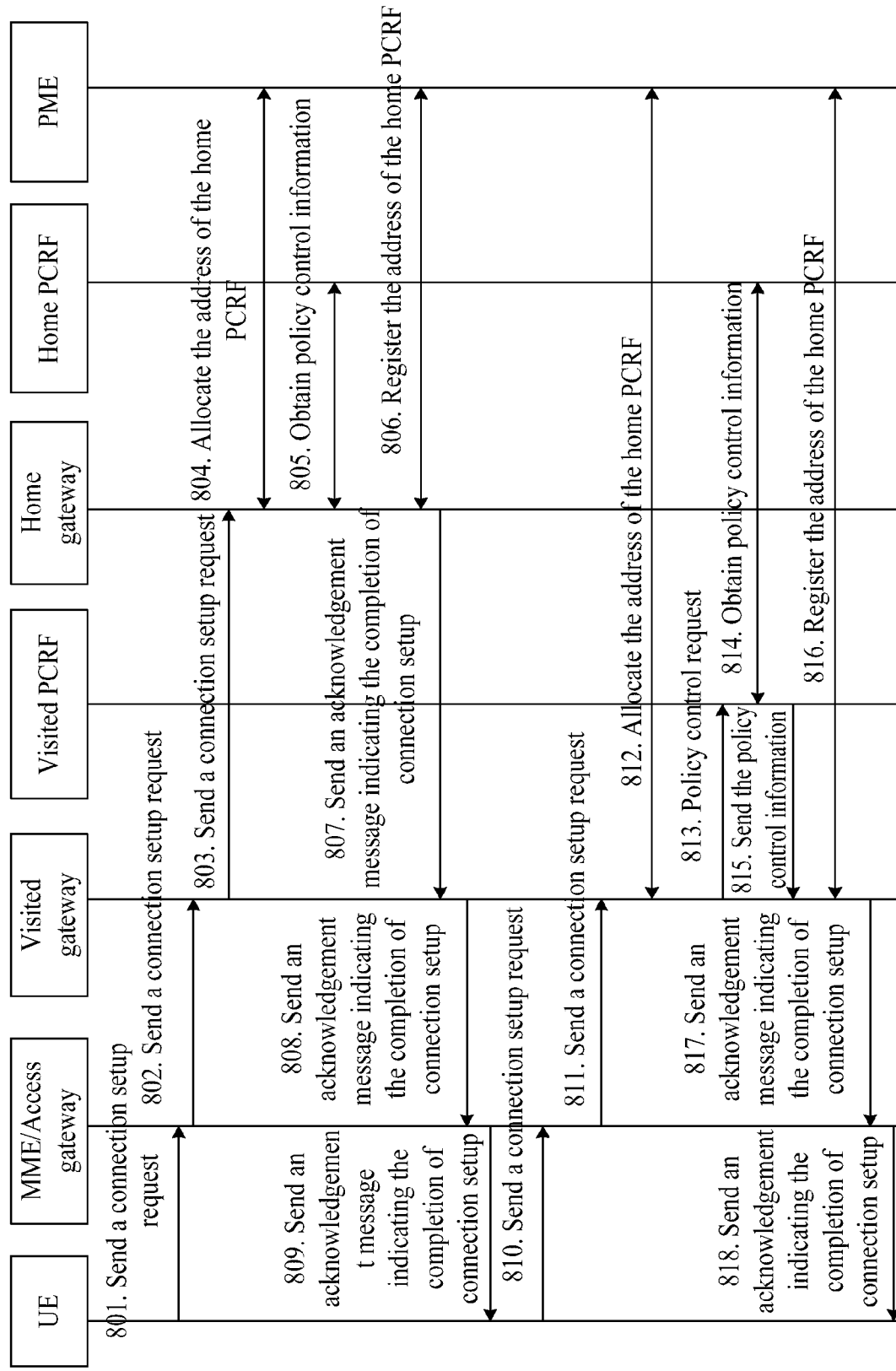
FIG. 8 is a flowchart of a PDF addressing method according to an eighth embodiment of the present invention.

FIG. 8 shows a PDF addressing method according to the eighth embodiment of the present invention. The method is applicable to a scenario in which the UE accesses a PDN by setting up data connections with a visited gateway and a home gateway when roaming. The data connection with the visited gateway may be used for optimizing the route of the UE in the visited network. The method may ensure that these two data connections use the same home PDF. The method includes the following steps:

Step 801: The UE sends a data connection setup request to the MME or access gateway.

Step 802: The MME or access gateway sends a connection setup request to the visited gateway.

Step 803: The visited gateway sends a connection setup request to the home gateway.

Step 804: The home gateway interacts with the PME to request the address of a home PCRF.

Specifically, this step is as follows: The home gateway sends a PDF address allocation request to the PME, which contains the UE ID, or the UE ID and PDN ID; the PME checks whether the addressing information of the PCRF is already available according to the UE ID, or the UE ID and PDN ID; if already available, the PME finds the address of the home PCRF associated with the UE ID, and sends it to the home gateway; otherwise, the PME allocates an address of a proper PCRF, and returns the address of the PCRF to the home gateway or provides the home gateway with addresses of multiple PCRFs for selection.

Step 805: The home gateway interacts with the home PCRF to obtain policy control information.

Step 806: The home gateway registers the addressing information of the PCRF with the PME.

Step 807: The home gateway sends an acknowledgement message indicating the completion of connection setup to the visited gateway.

Step 808: The visited gateway sends an acknowledgement message indicating the completion of connection setup to the MME or access gateway.

Step 809: The MME or access gateway sends an acknowledgement message indicating the completion of connection setup to the UE.

Step 810: The UE sends a data connection setup request to the MME or access gateway.

Step 811: The MME or access gateway sends a connection setup request to the visited gateway.

Step 812: The visited gateway interacts with the PME to request the address of the home PCRF.

Specifically, this step is as follows: The visited gateway sends a PDF address allocation request to the PME, which contains the UE ID; the PME checks whether the addressing information of the PCRF is already available according to the UE ID; if already available, the PME finds the address of the home PCRF associated with the UE ID, and sends it to the visited gateway; otherwise, the PME allocates an address of a proper PCRF, and returns the address of the PCRF to the visited gateway or provides the visited gateway with addresses of multiple PCRFs for selection.

Step 813: The visited gateway sends a policy control request to the visited PCRF. The policy control request includes the UE ID, PDN ID and address of the home PDF.

Step 814: The visited PCRF obtains the policy control information of the home network from the home PCRF.

Step 815: The visited PCRF generates policy control information of the visited network, obtains policy control information through negotiation with the policy control information of the home network, and sends the obtained policy control information to the visited gateway.

Step 816: The visited gateway registers the addressing information of the home PCRF with the PME.

Step 817: The visited gateway sends an acknowledgement message indicating the completion of connection setup to the MME or access gateway.

Step 818: The MME or access gateway sends an acknowledgement message indicating the completion of connection setup to the UE.

Step 812 may also be replaced as follows: The visited PCRF sends a PDF address allocation request to the PME after the visited gateway sends a policy control request to the visited PCRF; after obtaining the ID information of the home PCRF, the visited PCRF executes step 814 to obtain policy control information, so that the visited PCRF is the same as the home PDF accessed by the home gateway in step 805.

Similarly, step 816 may be replaced as follows: After step 814, the visited PCRF registers the addressing information of the home PCRF with the PME.

The preceding steps 801 to 809 describe a process of setting up a data connection between the UE and the home gateway. The preceding steps 810 to 818 describe a process of setting up a data connection between the UE and the visited gateway. Either of the two data connections may be set up earlier. If the addressing information of the home PCRF is registered in the earlier data connection process, the addressing information of the home PCRF does not need to be registered in the later data connection process, which may also achieve the objective of the present invention.

In the eighth embodiment of the present invention, the PME registers the addressing information of the home PCRF. In this case, when the UE accesses a PDN by setting up data connections with the visited gateway and home gateway, the UE can obtain the address of the home PCRF that is accessed in the earlier data connection in the later data connection process, thus ensuring that these two data connections of the same UE use the same home PCRF.

Figure 9:
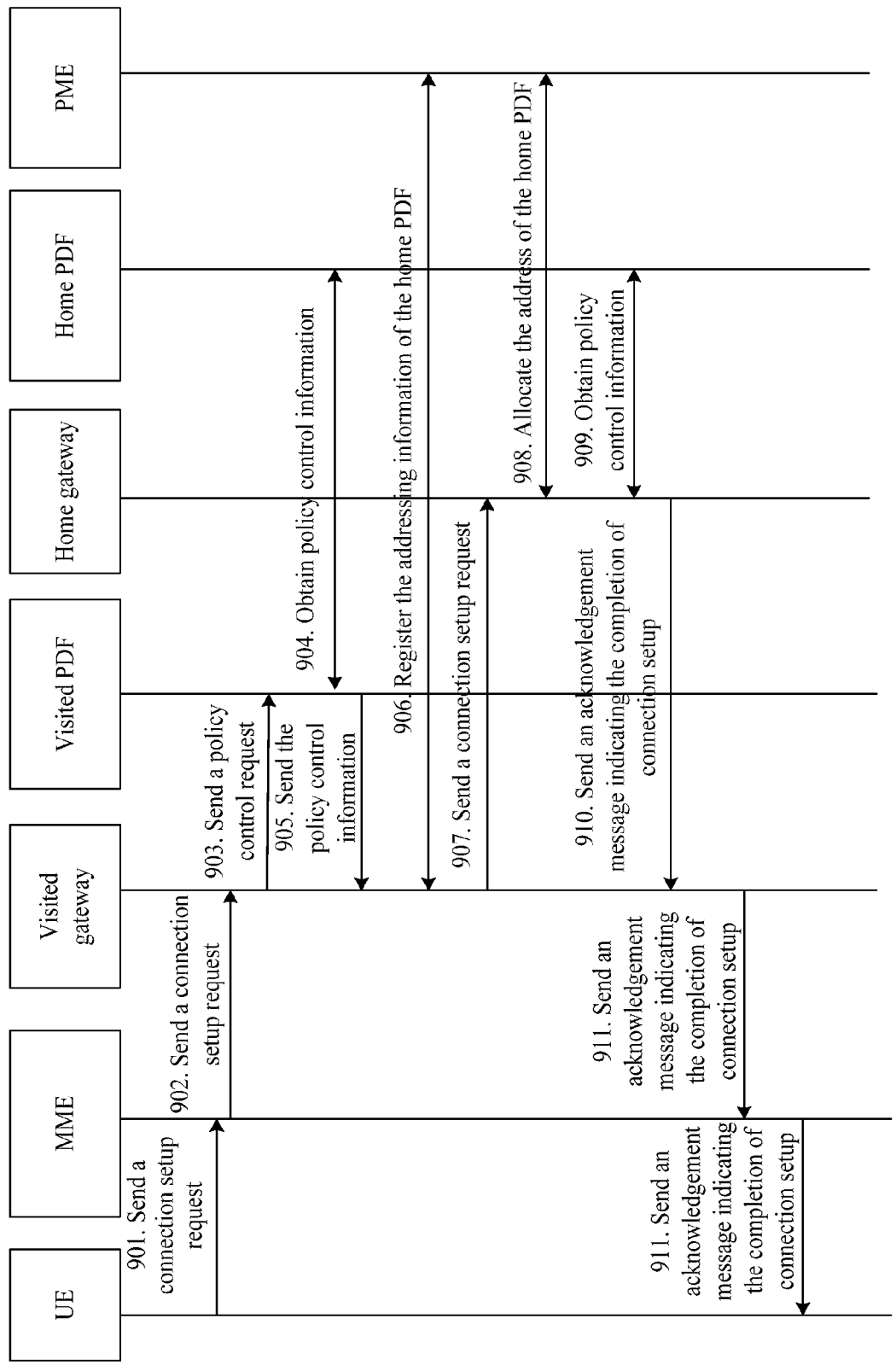
FIG. 9 is a flowchart of a PDF addressing method according to a ninth embodiment of the present invention.

FIG. 9 shows a PDF addressing method according to the ninth embodiment of the present invention. The method is applicable to a scenario in which a home gateway needs to connect to a home PDF to obtain policy control information of the home network and a visited gateway also needs to contact the home PDF for policy negotiation when the UE is roaming. That is, the visited gateway and home gateway correspond to the same data connection, and should access the same home PDF. The method includes the following steps:

Step 901: The UE sends a connection setup request to the MME.

Step 902: The MME sends a connection setup request to the visited gateway.

Step 903: The visited gateway sends a policy control request to the visited PDF. The policy control request includes the UE ID and PDN ID.

Step 904: The visited PDF obtains the policy control information of the home network from the home PDF.

Step 905: The visited PDF generates policy control information of the visited network, obtains policy control information through negotiation with the policy control information of the home network, and sends the obtained policy control information and address of the home PDF to the visited gateway.

Step 906: The visited gateway registers the addressing information of the home PDF with the PME.

Specifically, this step is as follows: The visited gateway sends a registration request containing the addressing information of the home PDF to the PME; the PME registers the addressing information of the home PDF according to the registration request.

Step 907: The visited gateway sends a connection setup request to the home gateway.

Step 908: The home gateway interacts with the PME to request the address of home PDF.

Specifically, this step is as follows: The home gateway sends a PDF address allocation request containing the UE ID to the PME; the PME obtains the address of the PDF associated with the UE ID according to the pre-registered addressing information of the PDF, and sends the obtained address of the PDF to the home gateway.

Step 909: The home gateway obtains policy control information of the home network from the home PDF.

Step 910: The home gateway sends an acknowledgement message indicating the completion of connection setup to the visited gateway.

Step 911: The visited gateway sends an acknowledgement message indicating the completion of connection setup to the MME.

Step 912: The MME sends an acknowledgement message indicating the completion of connection setup to the UE.

In the ninth embodiment of the present invention, the PME registers the addressing information of the home PCRF, and the home gateway obtains the address of the home PCRF from the PME. Thus, when the visited gateway and the home gateway correspond to the same data connection, they can access the same home PDF.

Figure 10:
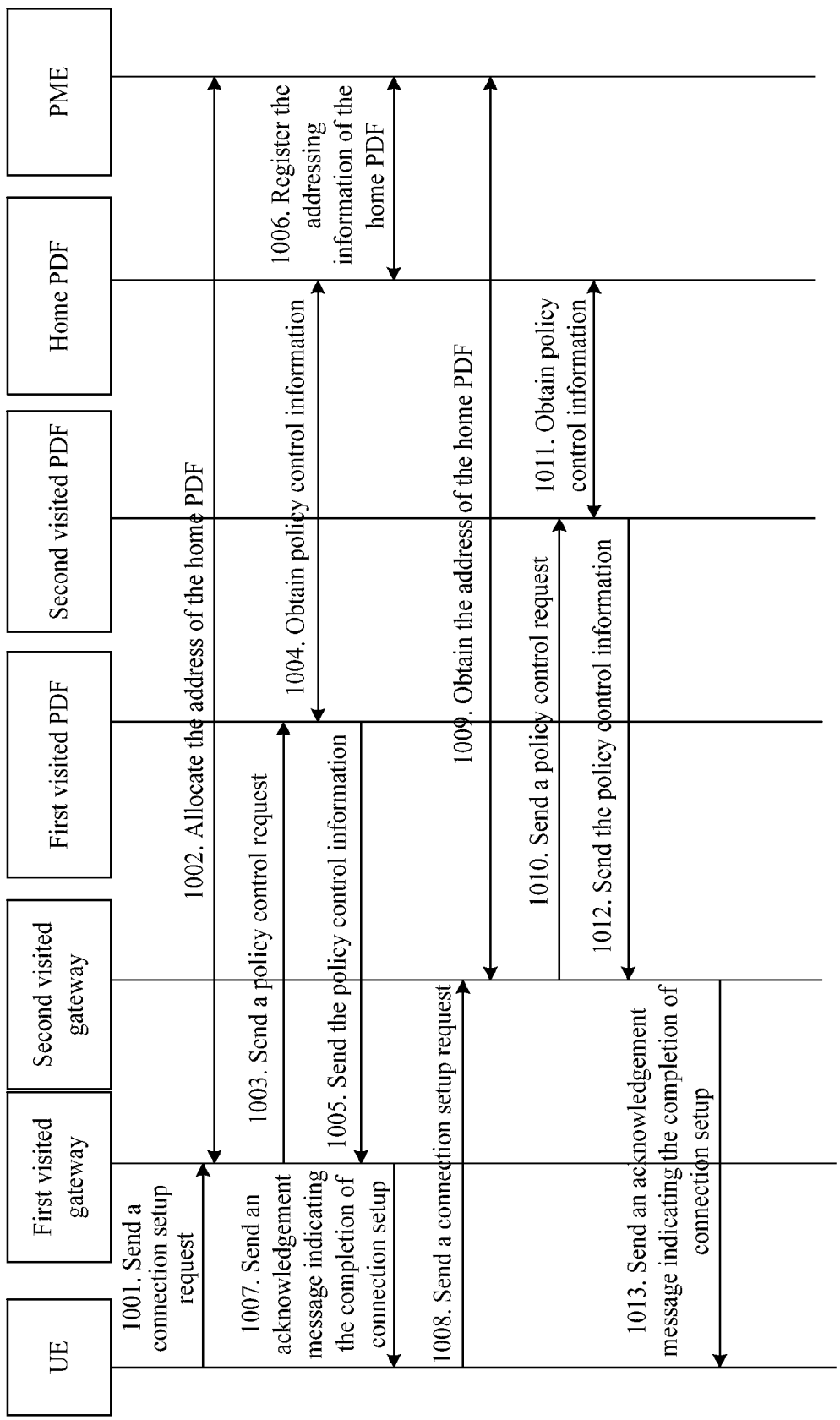
FIG. 10 is a flowchart of a PDF addressing method according to a tenth embodiment of the present invention.

FIG. 10 shows a PDF addressing method according to the tenth embodiment of the present invention. The method is applicable to a scenario in which the UE moves from one visited network to another visited network and uses a route optimization policy for the data connection in the visited network. The method includes the following steps:

Step 1001: The UE sends a connection setup request to a first visited gateway.

Step 1002: The first visited gateway interacts with the PME to request the address of the home PDF.

Step 1003: The first visited gateway sends a policy control request containing the address of the home PDF to a first visited PDF.

Step 1004: The first visited PDF obtains policy control information of the home network from the home PDF.

Step 1005: The first visited PDF generates policy control information of the visited network, obtains policy control information through negotiation with the policy control information of the home network, and sends the obtained policy control information to the first visited gateway.

Step 1006: The home PDF registers the addressing information of the home PDF with the PME.

Specifically, this step is as follows: The home PDF sends a registration request containing the addressing information of the home PDF to the PME; the PME registers the addressing information of the PDF according to the registration request.

Step 1007: The first visited gateway sends an acknowledgement message indicating the completion of connection setup to the UE.

Then, the UE roams to a second visited network.

Step 1008: The UE sends a connection setup request to a second visited gateway.

Step 1009: The second visited gateway obtains the address of the home PDF from the PME according to the UE ID.

Specifically, this step is as follows: The second visited gateway sends a PDF address allocation request containing the UE ID to the PME; The PME obtains the address of the PDF according to the pre-registered addressing information of the PDF, and sends the obtained address of the PDF to the second visited gateway.

Step 1010: The second visited gateway sends a policy control request containing the address of the home PDF to the second visited PDF.

Step 1011: The second visited PDF obtains policy control information of the home network from the home PDF.

Step 1012: The second visited PDF generates policy control information of the visited network, obtains policy control information through negotiation with the policy control information of the home network, and sends the obtained policy control information to the second visited gateway.

Step 1013: The second visited gateway sends an acknowledgement message indicating the completion of connection setup to the UE.

In the tenth embodiment of the present invention, the first visited gateway registers the addressing information of the home PCRF with the PME, and the second visited gateway obtains the address of the home PCRF from the PME. This can ensure that the first visited gateway and the second visited gateway access the same home PCRF and use the policy control information generated by the same home PCRF. Thus, a policy and charging control (PCC) architecture may be used to control which services need to undergo route optimization and which services need to be routed back to the home network.

Figure 11:
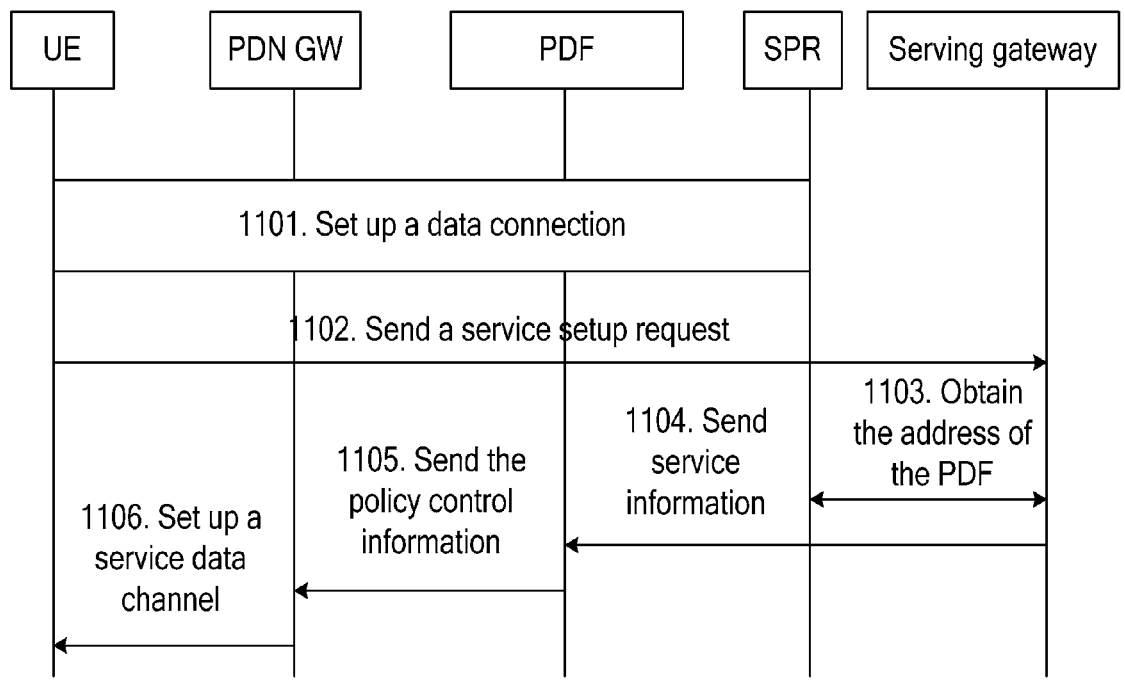
FIG. 11 is a flowchart of a PDF addressing method according to an eleventh embodiment of the present invention.

FIG. 11 shows a PDF addressing method according to the eleventh embodiment of the present invention. The method is applicable to a scenario in which the UE initiates a service setup request after setting up data connections and the application function sets up a service data channel for the data service of the UE to ensure the quality of service (QoS). The method includes the following steps:

Step 1101: The PDN GW, as the PEP, obtains policy control information from the PDF, sets up a data connection with the UE, and registers the addressing information of the PDF with the PME.

Step 1102: The UE sends a service setup request containing the UE ID to the application function.

Step 1103: The application function obtains the address of the PDF from the PME according to the UE ID.

Specifically, this step is as follows: The application function sends a PDF address allocation request containing the UE ID to the PME; the PME obtains the address of the PDF according to the pre-registered addressing information of the PDF, and sends the obtained address of the PDF to the application function.

Step 1104: The application function sends service information as requested by the UE to the PDF.

Step 1105: The PDF generates policy control information applicable to the service according to the service information as requested by the UE, and sends the policy control information to the PDN GW which acts as the PEP.

Step 1106: The PDN GW sets up a service data channel with the UE according to the policy control information applicable to the service.

In the eleventh embodiment of the present invention, after receiving a PDF address allocation request from the application function, the PME obtains the address of the PDF associated with the UE ID according to the pre-registered addressing information of the PDF; then the PME sends the obtained address of the PDF to the application function so that the application function can send service information to and access the PDF used in the previous connection.

In the preceding embodiment, the PDF may be located in the PCRF. In this case, the addressing information of the PDF is the addressing information of the PCRF, which is an association between the UE ID and the address of the PCRF or an association among the address of the PCRF, the UE ID and the PDN ID.

In the preceding embodiment, the NE with the PME functions is called a PME. The NE may be an SPR or an AAA/HSS, which does not affect the implementation of the present invention.

It is understandable to those skilled in the art that all or part of the steps in the preceding embodiments may be implemented by hardware instructed by a program. The program may be stored in a computer readable storage medium such as a read-only memory (ROM), a random access memory (RAM), a magnetic disk or a compact disk (CD).

In the preceding embodiments, a PDF may be identified by the domain name or address of the PDF, or a PDF may be identified by the combination of the domain name and address of the PDF or by other IDs, which may also achieve the objective of the present invention.

Figure 12:
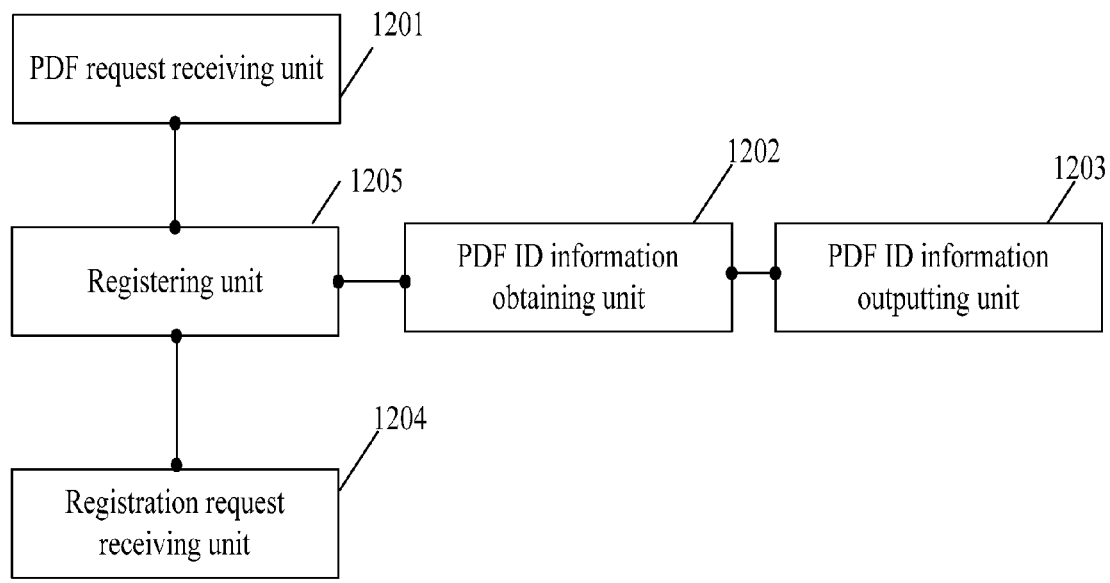
FIG. 12 shows a structure of an NE according to a twelfth embodiment of the present invention.

FIG. 12 shows an NE according to the twelfth embodiment of the present invention. The NE may be located in the SPR or AAA/HSS and includes:

a PDF request receiving unit 1201, configured to receive a PDF allocation request containing a UE ID;

a PDF ID information obtaining unit 1202, configured to obtain ID information of a PDF associated with the UE ID according to pre-registered addressing information of the PDF, where the addressing information of the PDF is an association between the UE ID and the ID information of the PDF, and the PDF associated with the UE ID is accessed by a first NE; and a PDF ID information outputting unit 1203, configured to output the obtained ID information of the PDF.

The NE further includes:

a registration request receiving unit 1204, configured to receive a registration request containing the addressing information of the PDF; and a registering unit 1205, configured to register the addressing information of the PDF after receiving the registration request containing the addressing information of the PDF.

Figure 13:
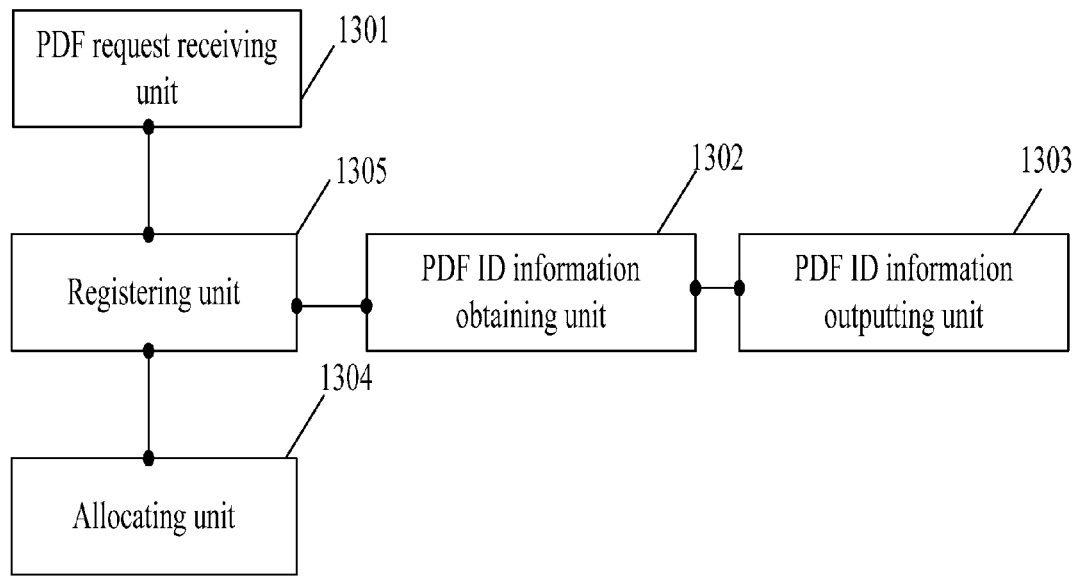
FIG. 13 shows a structure of an NE according to a thirteenth embodiment of the present invention.

FIG. 13 shows an NE according to the thirteenth embodiment of the present invention. The NE may be located in the SPR or AAA/HSS and includes:

a PDF request receiving unit 1301, a PDF ID information obtaining unit 1302, and a PDF ID information outputting unit 1303, functions of and connection relations among which are the same as those in the eleventh embodiment.

The NE further includes:

an allocating unit 1304, configured to allocate the PDF; and a registering unit 1305, configured to register the addressing information of the PDF according to the ID information of the allocated PDF and the UE ID.

After receiving a PDF allocation request, the NEs according to the twelfth and thirteenth embodiments of the present invention obtain and output the ID information of the PDF associated with the UE ID according to the pre-registered addressing information of the PDF. Thus, the NE requesting a PDF can obtain the ID information of the PDF, and access the same PDF as other NEs that serve the UE. When the same UE has set up two data connections, an ongoing data connection or data service channel can use the same PDF as that used in the previous connections to perform policy control.

Figure 14:
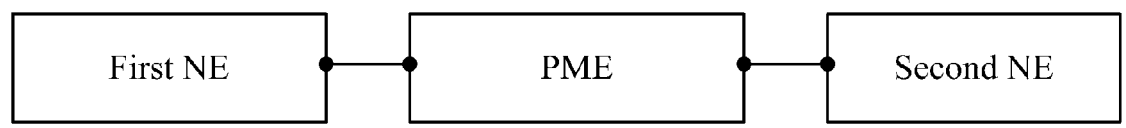
FIG. 14 shows a structure of an NE according to a fourteenth embodiment of the present invention.

FIG. 14 shows a network system according to the fourteenth embodiment of the present invention. The network system includes a PME and a second NE.

The PME is configured to: receive a PDF allocation request containing a UE ID from the second NE; obtain the ID information of the PDF associated with the UE ID according to the pre-registered addressing information of the PDF, where the addressing information of the PDF is an association between the UE ID and the ID information of the PDF, and the PDF associated with the UE ID is accessed by the first NE; and send the obtained ID information of the PDF to the second NE.

The second NE is configured to: send a PDF allocation request to the PME, and receive the ID information of the PDF from the PME.

The network system further includes:

a first NE, configured to send a registration request containing the addressing information of the PDF to the PME; and the PME, further configured to register the addressing information of the PDF after receiving the registration request.

Or the network system further includes:

a first NE, configured to send a PDF allocation request to the PME; and the PME, further configured to: allocate a PDF for the first NE when determining that no addressing information of the PDF is registered according to the UE ID contained in the PDF allocation request, and register the addressing information of the allocated PDF.

The first NE may be an access gateway, a PDN GW or a visited PDF, and the second NE may be an access gateway, a PDN GW, a visited PDF or an application function. The PME may be an independent physical entity or located in a physical entity with an SPR or an AAA/HSS.

After receiving a PDF allocation request, the PME according to the fourteenth embodiment of the present invention obtains the ID information of the PDF associated with the UE ID according to the pre-registered addressing information of the PDF, and sends the obtained ID information of the PDF to the second NE. Thus, the second NE can obtain the ID information of the PDF, and access the same PDF as other NEs that serve the UE. When the same UE has set up two data connections, an ongoing data connection can use the same PDF as that used in the previous connections to perform policy control.

Detailed above are a PDF addressing method, an NE and a network system according to the embodiments of the present invention. It is apparent that those skilled in the art can make various modifications and variations to the invention without departing from the spirit and scope of the invention. In conclusion, the present invention is not limited to the contents of the specifications.

What is claimed is:

1. A policy decision function (PDF) addressing method, comprising:

receiving, by a policy management entity (PME), a first PDF allocation request from an Access gateway, wherein the first PDF allocation request contains a user equipment (UE) identifier (ID);

allocating a PDF in response to the first PDF allocation request, wherein the allocated PDF is used to generate policy control information;

registering, by the PME, addressing information of the allocated PDF, wherein the addressing information of the allocated PDF includes an association between the UE ID and ID information of the allocated PDF associated with the UE ID, wherein the ID information of the allocated PDF associated with the UE ID includes a domain name or address information of the allocated PDF associated with the UE ID;

receiving, by the PME, a second PDF allocation request from a Core gateway, wherein the second PDF allocation request includes the UE ID;

obtaining, by the PME, the ID information of the allocated PDF associated with the UE ID from the registered addressing information of the allocated PDF; and sending, by the PME, the obtained ID information of the allocated PDF associated with the UE ID to the Core gateway.

2. A non-transitory computer readable storage medium encoded with computer program stored thereon for:

receiving a first policy decision function (PDF) allocation request from an Access gateway and allocating a PDF in response to a first PDF allocation request, wherein the first PDF allocation request includes a user equipment (UE) identifier (ID), wherein the allocated PDF is used to generate policy control information;

registering addressing information of the allocated PDF, wherein the addressing information of the allocated PDF includes an association between the UE ID and ID information of the PDF associated with the UE ID, wherein the ID information of the allocated PDF associated with the UE ID includes a domain name or address information of the allocated PDF associated with the UE ID;

receiving a second PDF allocation request from a Core gateway, wherein the second PDF allocation request includes the UE ID;

obtaining the ID information of the allocated PDF associated with the UE ID from the registered addressing information of the allocated PDF; and outputting the obtained ID information of the allocated PDF associated with the UE ID to the Core gateway.

3. A policy decision function (PDF) addressing method, comprising:

receiving, by a policy management entity (PME), a first PDF allocation request from an Access gateway, wherein the first PDF allocation request contains a user equipment (UE) identifier (ID) and a public data network (PDN) ID;

allocating a PDF in response to the first PDF allocation request, wherein the allocated PDF is used to generate policy control information;

registering, by the PME, addressing information of the allocated PDF, wherein the addressing information of the allocated PDF includes an association of the UE ID, the PDN ID, and ID information of the PDF associated with the UE ID and the PDN ID, wherein the ID information of the allocated PDF associated with the UE ID and the PDN ID includes a domain name or address information of the allocated PDF associated with the UE ID and the PDN ID;

receiving, by the PME, a second PDF allocation request from a Core gateway, wherein the second PDF allocation request includes the UE ID and the PDN ID;

obtaining, by the PME, the ID information of the allocated PDF associated with the UE ID and the PDN ID from the registered addressing information of the allocated PDF; and sending, by the PME, the obtained ID information of the allocated PDF associated with the UE ID and the PDN ID to the Core gateway.

* * * * *